July 28, 1959
J. F. STARBIRD ET AL
2,896,472
REMOTE CONTROL APPARATUS
Filed April 21, 1958
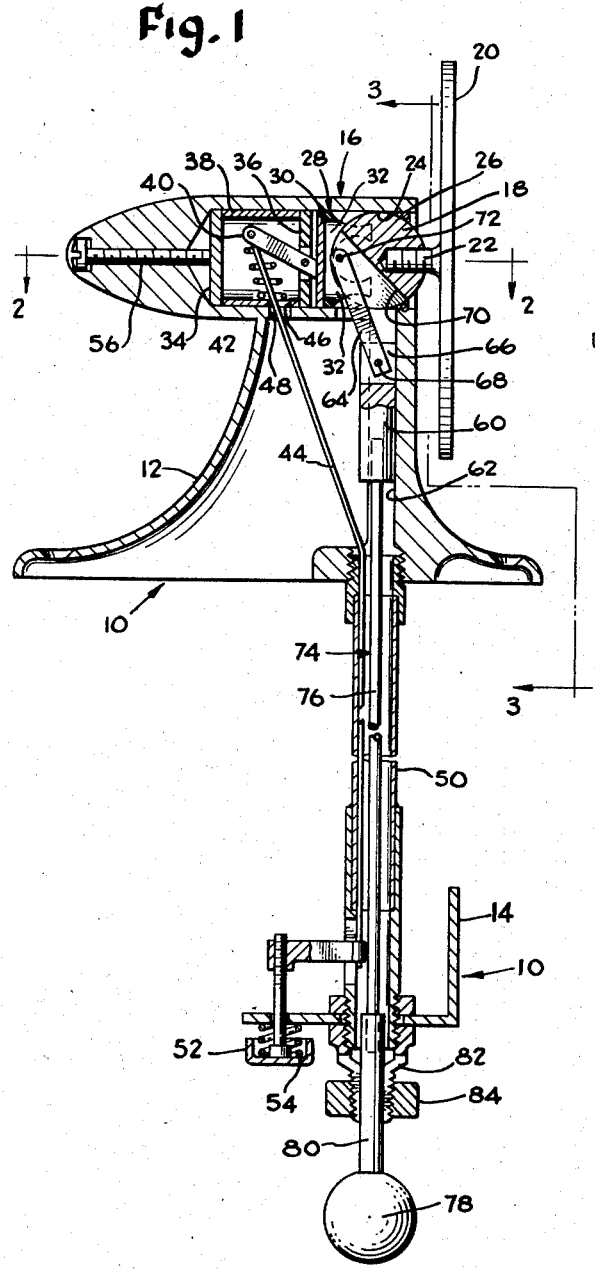
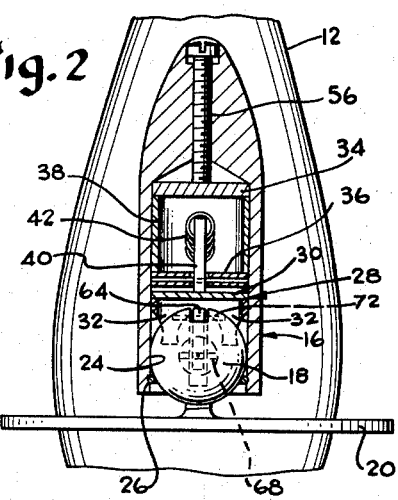
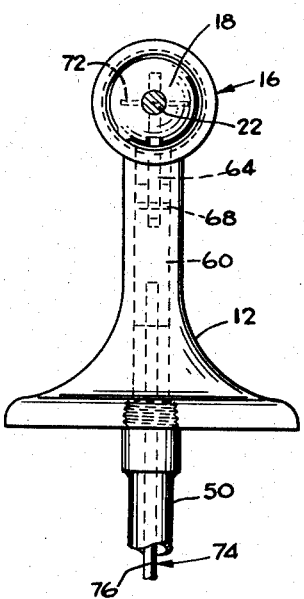
INVENTORS.
JAMES F. STARBIRD
NATHAN C. BACOM
BY THEIR ATTORNEYS.
HARRIS, KIECH, FOSTER & HARRIS

# United States Patent Office 2,896,472
Patented July 28, 1959

2,896,472

REMOTE CONTROL APPARATUS

James F. Starbird, Sherman Oaks, and Nathan C. Bacom, Studio City, Calif.

Application April 21, 1958, Serial No. 729,965

7 Claims. (Cl. 74—491)

The present invention relates in general to an apparatus for controlling the position of an object from a remote location and since the invention is particularly applicable to a remote position-control apparatus for a rear view mirror mounted on the side of an automotive vehicle, such as an automobile, bus, truck, or the like, it will be considered in such connection herein for illustrative purposes with the understanding that the invention is susceptible of other applications.

Generally speaking, the invention contemplates an apparatus or device which includes a supporting structure providing a ball socket, a ball pivotable in the ball socket, a shaft carried by the supporting structure adjacent the ball socket and rotatable and reciprocable relative to the supporting structure, and means interconnecting the ball and the shaft for pivoting the ball in one plane in response to rotation of the shaft and for pivoting the ball in another plane perpendicular to the first plane in response to axial movement of the shaft.

A primary object of the invention is to provide a device of the foregoing nature wherein the axis of at least a portion of the shaft adjacent the ball socket intersects the center of the ball and wherein the means interconnecting such shaft portion and the ball includes a link pivotally connected to the shaft portion by a first pivot means providing a first pivot axis intersected by and perpendicular to the axis of the shaft portion, and pivotally connected to the ball at a point spaced laterally from the axis of the shaft portion by a second pivot means providing a second pivot axis parallel to the first pivot axis. With this construction, rotation of the shaft results in pivoting of the ball in one plane and axial movement of the shaft results in pivoting of the ball in a second plane perpendicular to the first, aligning the axis of the shaft portion with the center of the ball permitting the production of the foregoing ball motion with only a simple link connecting the shaft portion and the ball. In other words, there is no necessity for any crank means, or equivalent means, on the shaft as would be the case if the axis of the shaft portion were offset laterally from the center of the ball.

Another object of the invention is to provide the ball with a chordal slot therein in a plane containing the axis of the shaft portion and perpendicular to the two pivot axes mentioned, the link extending into such chordal slot and being pivotally connected to the ball within the periphery of the ball. Thus, a very simple, compact structure results, which is an important feature.

Another object is to provide locking means for preventing pivotal movement of the ball relative to the ball socket, thereby fixing in position an object, such as a rear view mirror, carried by the ball and damping mirror vibration.

Another object is to provide a locking means which includes releasable means for biasing a movable wall of the ball socket into locking engagement with the ball.

A further object is to provide a locking means which includes releasable means engageable with the shaft for preventing rotary and/or reciprocatory movement of the shaft.

The foregoing objects, advantages, features and results of the present invention, together with various other objects, advantages, features and results thereof which will be evident to those skilled in this art in the light of the present disclosure, may be attained with the exemplary embodiment of the invention described in detail hereinafter and illustrated in the accompanying drawing, in which:

Fig. 1 is a sectional view of a remote position-control apparatus or device of the invention; and Figs. 2 and 3 are fragmentary sectional views respectively taken along the arrowed lines 2—2 and 3—3 of Fig. 1 of the drawing.

Referring to the drawing, the numeral 10 designates generally a supporting structure shown as comprising a support 12 adapted to be mounted externally of an automotive vehicle on one side thereof and a support 14 adapted to be mounted within the automotive vehicle in a location conveniently accessible to the driver thereof.

The outer support 12 provides a ball socket designated generally by the numeral 16 and pivotally housing a ball 18 having connected thereto a mirror 20, the latter being provided with a stud 22 threaded into the ball in the particular construction illustrated. The ball socket 16 includes a bore 24 in the support 12 from which the ball projects slightly, escape of the ball from the bore being prevented by a snap ring 26. The ball socket 16 also includes a movable wall 28 comprising a disc 30 carrying fingers 32 which engage the ball 18, the ball being held within the bore 24 between the movable wall 28 and the snap ring 26.

Also disposed within the bore 24 are discs 34 and 36 spaced apart by a tubular spacer 38, the disc 36 having pivotally connected thereto a lever 40 one end of which engages the disc 30 of the movable wall 28. As will be apparent, pivotal movement of the lever 40 in the counterclockwise direction results in movement of the wall 28 toward the snap ring 26 so as to clamp the ball between the snap ring and the wall 28, thereby locking the mirror 20 in a preselected position.

The lever 40 is normally biased in the clockwise direction to free the ball 18 by a compression spring 42 engaging the lever and the spacer 38. In order to pivot the lever 40 in the counterclockwise direction to lock the ball 18 in a preselected position, a control element, shown as a flexible cord 44, is attached to the end of the lever opposite the end thereof in engagement with the movable wall 28. The cord 44 extends through openings 46 and 48 in the spacer 38 and the support 12, respectively, and further extends through a tubular housing 50 which interconnects the supports 12 and 14. Mounted on the inner support 14 is a push button 52 which is connected to the cord 44, the button 52 being biased in a direction to tension the cord 44 by a compression spring 54 engaging the button and the support 14. As will be apparent, such tensioning of the cord by the spring 54, which is stiffer than the spring 42, pivots the lever 40 in the counterclockwise direction so as to bias the movable wall 28 into locking engagement with the ball 18. In order to release the ball so that the mirror 20 may be moved into another position, it is merely necessary to depress the push button 52.

Threaded into the outer support 12 is a screw 56 which bears against the disc 34. As will be apparent, the degree of frictional engagement between the movable wall 28 and the ball 18 may be varied by adjusting the position of the screw 56. Normally, the adjustment of the screw 56 is such that the ball 18 is firmly locked in a preselected position when the cord 44 is tensioned by the spring 54.

Considering the manner in which the angular position of the ball 18, and thus the angular position of the mirror 20, is controlled, the outer support 12 carries a shaft portion 60, the axis of which intersects the center of the ball 18, the shaft portion 60 being rotatable and reciprocable relative to the support 12 in a groove 62 having an angular extent in cross-section of more than 180°. The shaft portion 60 is connected to the ball 18 by a link 64, this link extending into a diametral notch 66 in the shaft portion 60 and being connected to the shaft portion by a pivot pin 68 the axis of which is perpendicular to and is intersected by the axis of the shaft portion. The other end of the link 64 extends into a chordal recess 70 in the ball 18, which recess is in a plane containing the axis of the shaft portion and the center of the ball. The link 64 is pivotally connected to the ball 18 by a pivot pin 72 parallel to the pivot pin 68 and perpendicular to the plane of the chordal recess 70.

With this construction, rotation of the shaft portion 60 about its axis results in pivoting of the ball 18, and thus of the mirror 20, in one plane, while movement of the shaft portion along its axis results in pivoting of the ball, and thus of the mirror, in another plane perpendicular to the first. Thus, by properly combining rotational and axial motion of the shaft portion 60, the mirror 20 may be oriented in any desired direction.

As previously indicated, the foregoing positional relationship and interconnection between the shaft portion 60 and the ball 18 results in a compact structure requiring no crank means, or equivalent means, on the shaft portion, as would be the case were the shaft portion located with its axis offset laterally from the center of the ball 18.

The shaft portion 60 forms part of a shaft 74 which includes a shaft member 76 extending through the tubular housing 50 and having a control handle 78 connected thereto. The shaft member 76 may be a straight rod, as shown, or it may be a flexible cable, in which case the tubular housing 50 is a flexible sheath. As will be apparent, the desired rotary and/or axial movement of the shaft portion 60 to position the mirror 20 as desired may be produced by rotating and/or axially moving the handle 78.

The handle 78 includes a stem 80 to which the shaft member 76 is connected and which extends through an expansible and contractible, externally tapered and externally threaded, fitting 82 carried by the support 14. Threaded on this fitting is a nut 84 by means of which the fitting may be contracted into locking engagement with the stem 80 to prevent rotation and/or axial movement of the shaft portion 60. Thus the fitting 82 and the nut 84 also provide a releasable locking means for the ball 18 and the mirror 20.

Although an exemplary embodiment of the invention has been disclosed herein for illustrative purposes, it will be understood that various changes, modifications and substitutions may be incorporated in such embodiment without departing from the spirit of the invention as defined by the claims which follow:

What is claimed is:

1. In combination: supporting structure providing a ball socket; a ball pivotable in said ball socket; a shaft carried by said supporting structure adjacent said ball socket and rotatable and reciprocable relative to said supporting structure, the axis of at least a portion of said shaft adjacent said ball socket intersecting the center of said ball; a link extending between said shaft portion and said ball; first pivot means pivotally interconnecting said link and said shaft; and second pivot means pivotally interconnecting said link and said ball at a point spaced laterally from said axis of said shaft portion.

2. In combination: supporting structure providing a ball socket; a ball pivotable in said ball socket; a shaft carried by said supporting structure adjacent said ball socket and rotatable and reciprocable relative to said supporting structure, the axis of at least a portion of said shaft adjacent said ball socket intersecting the center of said ball; a link extending between said shaft portion and said ball; first pivot means pivotally interconnecting said link and said shaft for relative pivotal movement about a first pivot axis intersected by and perpendicular to said axis of said shaft portion; and second pivot means pivotally interconnecting said link and said ball at a point spaced laterally from said axis of said shaft portion for relative pivotal movement about a second pivot axis parallel to said first pivot axis.

3. In combination: supporting structure providing a ball socket; a ball pivotable in said ball socket; a shaft carried by said supporting structure adjacent said ball socket and rotatable and reciprocable relative to said supporting structure, the axis of at least a portion of said shaft adjacent said ball socket intersecting the center of said ball, said ball having a chordal slot therein in a plane containing said axis of said shaft portion; a link extending between said shaft portion and said ball and extending into said slot; first pivot means pivotally interconnecting said link and said shaft for relative pivotal movement about a first pivot axis intersected by and perpendicular to said axis of said shaft portion; and second pivot means pivotally interconnecting said link and said ball at a point spaced laterally from said axis of said shaft portion for relative pivotal movement about a second pivot axis parallel to said first pivot axis and perpendicular to said plane of said slot.

4. In combination: supporting structure providing a ball socket; a ball pivotable in said ball socket; a shaft carried by said supporting structure adjacent said ball socket and rotatable and reciprocable relative to said supporting structure, the axis of at least a portion of said shaft adjacent said ball socket intersecting the center of said ball; a link extending between said shaft portion and said ball; first pivot means pivotally interconnecting said link and said shaft for relative pivotal movement about a first pivot axis intersected by and perpendicular to said axis of said shaft portion; second pivot means pivotally interconnecting said link and said ball at a point spaced laterally from said axis of said shaft portion for relative pivotal movement about a second pivot axis parallel to said first pivot axis; and locking means for preventing pivotal movement of said ball relative to said ball socket.

5. In combination: supporting structure providing a ball socket having a movable wall; a ball pivotable in said ball socket and engaged by said movable wall; a shaft carried by said supporting structure adjacent said ball socket and rotatable and reciprocable relative to said supporting structure, the axis of at least a portion of said shaft adjacent said ball socket intersecting the center of said ball; a link extending between said shaft portion and said ball; first pivot means pivotally interconnecting said link and said shaft for relative pivotal movement about a first pivot axis intersected by and perpendicular to said axis of said shaft portion; second pivot means pivotally interconnecting said link and said ball at a point spaced laterally from said axis of said shaft portion for relative pivotal movement about a second pivot axis parallel to said first pivot axis; and locking means for preventing pivotal movement of said ball relative to said ball socket, including releasable means for biasing said movable wall of said ball socket against said ball.

6. In combination: supporting structure providing a ball socket; a ball pivotable in said ball socket; a shaft carried by said supporting structure adjacent said ball socket and rotatable and reciprocable relative to said supporting structure, the axis of at least a portion of said shaft adjacent said ball socket intersecting the center of said ball; a link extending between said shaft portion and said ball; first pivot means pivotally interconnecting said link and said shaft for relative pivotal movement about a first pivot axis intersected by and perpendicular to said axis of said shaft portion; second pivot means pivotally interconnecting said link and said ball at a point spaced laterally from said axis of said shaft portion for relative pivotal movement about a second pivot axis parallel to said first pivot axis; and locking means for preventing pivotal movement of said ball relative to said ball socket, including releasable means engageable with said shaft for preventing rotary and/or axial movement of said shaft relative to said supporting structure.

7. In combination: supporting structure providing a ball socket; a ball pivotable in said ball socket; a shaft carried by said supporting structure adjacent said ball socket and rotatable and reciprocable relative to said supporting structure, the axis of at least a portion of said shaft adjacent said ball socket intersecting the center of said ball; and means interconnecting said portion of said shaft and said ball for pivoting said ball in different directions in response to rotation and reciprocation, respectively, of said shaft.

References Cited in the file of this patent

UNITED STATES PATENTS 1,576,168    Whitsett _____ Mar. 9, 1926